(12) United States Patent
Fujiwara et al.

(10) Patent No.: US 6,557,073 B1
(45) Date of Patent: Apr. 29, 2003

(54) STORAGE APPARATUS HAVING A VIRTUAL STORAGE AREA

(75) Inventors: Hiroshi Fujiwara, Kawasaki (JP); Hajime Sugiura, Tama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/241,889

(22) Filed: Feb. 1, 1999

(30) Foreign Application Priority Data

Jun. 30, 1998 (JP) .......................................... 10-185220

(51) Int. Cl.$^7$ .............................................. G06F 12/00
(52) U.S. Cl. .......................................... 711/111; 711/4
(58) Field of Search .................................. 711/111, 159, 711/160, 161, 162, 4, 205; 707/205

(56) References Cited

U.S. PATENT DOCUMENTS 4,310,883 A * 1/1982 Clifton et al. ................ 707/205
5,963,963 A * 10/1999 Schmuck et al. ............. 707/10
5,991,775 A * 11/1999 Beardsley et al. ........... 707/205

OTHER PUBLICATIONS

IBM 3850 Mass Storage System (MSS) Principles of Operation: Theory. Second Edition (Nov. 1981).*

* cited by examiner

Primary Examiner—Matthew Kim
Assistant Examiner—Matthew D. Anderson
(74) Attorney, Agent, or Firm—Greer, Burns & Crain, Ltd.

(57) ABSTRACT

Virtual tape volumes are grouped depending on their attributes, in order to improve access efficiency of the host computer. A storage apparatus includes a virtual storage area for storing a virtual tape volume, a data transfer control program for controlling the data transfer among the virtual storage area, a host computer and a real tape volume, and a virtual tape information database for storing attribute information of the virtual tape volume. The data transfer control program forms groups of the virtual tape volumes having the identical attribute, transfers and develops, to the virtual storage area from the real tape volume, all virtual tape volumes included in the group for the request from the host computer to any one of the virtual tape volumes in the group, and generates a high speed response to such request when the host computer has issued a request to such group.

10 Claims, 17 Drawing Sheets

| TAPE VOLUME INFORMATION(1) | | | |
|---|---|---|---|
| ①TAPE VOLUME NAME | ②HEADER INFORMATION | ③TOTAL BLOCK SIZE | ④TAPE CONDITION |
| ⑤PROTECT INFORMATION | ⑥TAPE GENERATION TIME | ⑦FINAL ACCESS TIME | ⑧FINAL WRITING TIME |
| ⑨FINAL MOUNT TIME | ⑩STAGE-OUT TIME | ⑪STAGE-OUT ACKNOWLEDGEMENT | ⑫NUMBER OF TIMES OF MOUNT |
| TAPE MARK INFORMATION(1) | ADDRESS POINTER TO HIGH SPEED STORAGE MEDIUM, POINTER TO REAL TAPE VOLUME INFORMATION | | |
| TAPE MARK INFORMATION(2) | | | |
| ...... | | | |
| TAPE MARK INFORMATION(n) | | | |
| TAPE VOLUME INFORMATION(2) | | | |
| ①TAPE VOLUME NAME | ②HEADER INFORMATION | ③TOTAL BLOCK SIZE | ④TAPE CONDITION |
| ⑤PROTECT INFORMATION | ⑥TAPE GENERATION TIME | ⑦FINAL ACCESS TIME | ⑧FINAL WRITING TIME |
| ⑨FINAL MOUNT TIME | ⑩STAGE-OUT TIME | ⑪STAGE-OUT ACKNOWLEDGEMENT | ⑫NUMBER OF TIMES OF MOUNT |
| TAPE MARK INFORMATION(1) | ADDRESS POINTER TO HIGH SPEED STORAGE MEDIUM, POINTER TO REAL TAPE VOLUME INFORMATION | | |
| TAPE MARK INFORMATION(2) | | | |
| ...... | | | |
| TAPE MARK INFORMATION(n) | | | |

Fig. 3

| VIRTUAL TAPE VOLUME GROUP (1) | | |
|---|---|---|
| ①GROUP NAME | ②TAPE VOLUME NAME (1) | ②TAPE VOLUME NAME (2) ... ②TAPE VOLUME NAME (n) |
| ③FINAL ACCESS TIME | ④WRITING DESTINATION | ⑤WRITING MODE |

| VIRTUAL TAPE VOLUME GROUP (2) | | |
|---|---|---|
| ①GROUP NAME | ②TAPE VOLUME NAME (1) | ②TAPE VOLUME NAME (2) ... ②TAPE VOLUME NAME (n) |
| ③FINAL ACCESS TIME | ④WRITING DESTINATION | ⑤WRITING MODE |

| REAL TAPE VOLUME GROUP (1) | | |
|---|---|---|
| ①GROUP NAME | ②REAL TAPE VOLUME NAME (1) | REAL TAPE VOLUME (2) ... REAL TAPE VOLUME (n) |
| ③WRITE MODE | ④FINAL ACCESS TIME | |

| REAL TAPE VOLUME GROUP (2) | | |
|---|---|---|
| ①GROUP NAME | ②REAL TAPE VOLUME (1) | REAL TAPE VOLUME (2) ... REAL TAPE VOLUME (n) |
| ③WRITE MODE | ④FINAL ACCESS TIME | |

STORAGE APPARATUS HAVING A VIRTUAL STORAGE AREA

The present invention relates to a storage apparatus to be connected, for example, to a computer apparatus such as a main frame. The present invention also relates to a virtual tape apparatus which uses a hard disk, etc. in place of a magnetic tape.

BACKGROUND OF THE INVENTION

In known computer systems, a tape library apparatus has mainly been used for backup of the information stored in the hard disk. The tape library apparatus has high memory capacity on the order of giga-bits or tera-bits by loading a plurality of magnetic tapes. However, existing magnetic tape employs a format in which one file is stored in a volume of magnetic tape. Therefore, when the capacity of a file to be backed up is smaller than the storing capacity of one volume of a magnetic tape, only a part of the magnetic tape is used for storing data. Accordingly, the total medium cost rises. Moreover, when one file is stored in one volume of magnetic tape, the number of magnetic tapes must be increased to the number of files to be backed up. In this case, the size of the tape library becomes high.

Therefore, in order to reduce the medium cost of the magnetic tape, a tape apparatus having a multi-file function has also been developed. The multi-file function realizes storing of a plurality of files to a volume of magnetic tape. However, when the multi-file system is introduced, a host computer is required to conduct complex management, for example, history management and catalog management. Also, a problem in operation is created because the multi-file system cannot be applied to the files to be used simultaneously.

Moreover, access to the magnetic tape is realized at a lower speed than that of the hard disk. Therefore, in the current situation where the amount of data is increasing rapidly, the time required for backup utilizing the magnetic tape also becomes remarkably long. The longer time required for backup jobs causes delays and perhaps other trouble in regular jobs.

Considering the circumstances explained above, recently, a virtual tape apparatus has been developed in which a hard disk, which can make access at higher speed than the magnetic tape, may be used in place of the magnetic tape.

In this virtual tape apparatus, the tape apparatus is virtually emulated on the hard disk within the disk subsystem connected to the host computer. Therefore, the virtual tape apparatus utilizes, as it is, the technology of the tape apparatus to make access to a storage medium at a speed higher than that of the actual tape apparatus.

In a virtual tape apparatus, a disk subsystem writes (stage out) a plurality of virtual tape volumes from the hard disks to a single actual tape on the occasion of writing the virtual tape volume stored in the hard disk to the actual physical tape (a physical tape is called a "real tape"). Thereby, in the virtual tape apparatus, the number of actual tapes required is reduced as much as possible and thereby reduction in size of the tape library can be realized and reduction of medium cost can also be realized.

In the virtual tape apparatus of the related art, a plurality of tape volumes are written on the same real tape in some cases. In this case, a virtual tape apparatus is sometimes required to read all of the contents of the real tape. Thereby, the performance of the virtual tape apparatus may be identical or rather deteriorated in comparison with the performance when the virtual tape apparatus is not provided and data is read in direct from the real tape volume.

OBJECTS AND SUMMARY OF THE INVENTION

The present invention has been proposed considering the background explained above. It is an object of the present invention to provide a new and improved storage apparatus consisting of a virtual tape apparatus which may be more effectively accessed from a host computer.

A tape volume can be given an attribute depending on its operation mode, to eliminate disadvantages of the virtual tape apparatus of the related art. In fact, it is better to form the groups of the virtual tape volumes depending on a selected attribute thereof. In known systems, though, some tape volumes are used periodically and some are not, and are mounted simultaneously or individually. However, in the virtual tape apparatus of the related art, the virtual tape volumes are not handled by discriminating based on the attribute thereof.

In view of attaining the object explained above, a storage apparatus is provided between a tape storage apparatus having a plurality of tape storage media and a driving mechanism, and a host computer, to store the data exchanged between the host computer and tape storage apparatus as a virtual tape volume. A virtual storage area is provided for storing virtual tape volumes, a data transfer control means controls data transfer among the virtual storage area, host computer and tape storage apparatus, and a database stores information regarding the selected attribute of the virtual tape volume. The data transfer control means forms groups of the virtual tape volumes having the identical attribute and identifies, when the host computer has issued a request to any one of the virtual tape volume groups, the other virtual tape volumes are included in the virtual tape volume group.

According to the present invention, the virtual tape volume groups are developed previously in the virtual storage area. Therefore, when a host computer has issued a request to the virtual tape volume in such a group, the response rate to this request can be improved.

The storage apparatus can be provided between a tape storage apparatus having a plurality of tape storage media and a driving mechanism, and a host computer. The storage apparatus stores the data exchanged between the host computer and tape storage apparatus as the virtual tape volumes. This aspect of the invention includes a virtual storage area for storing virtual tape volumes, a data transfer control means for controlling data transfer among the virtual storage area, host computer and tape storage apparatus, a database for storing information regarding at least one attribute of the virtual tape volumes, a virtual special tape volume collecting and recording the information regarding attributes of all virtual tape volumes, and a means for reflecting the contents of changes of virtual special tape volumes edited by the host computer on the information regarding the attributes of virtual tape volumes stored in the database.

According to this aspect of the present invention, the host computer edits the virtual special tape volumes. The host computer reflects contents of changes of the edited virtual special tape volumes on the information regarding the attributes of the virtual tape volumes stored in the database. Thereby, the host computer can automatically edit the attributes of the virtual tape volumes.

BRIEF DESCRIPTION OF THE DRAWINGS

These and other features of this invention and the manner of obtaining them will become more apparent, and the invention itself will be best understood by reference to the following description of an embodiment of the invention taken in conjunction with the accompanying drawings, in which:

FIG. 3 is a diagram showing an example of a tape volume information record format of a virtual tape volume information table stored in the virtual tape apparatus;

FIG. 4 is a schematic diagram showing an example of a virtual tape volume group record format of a virtual tape volume group information table stored in the virtual tape apparatus;

FIG. 7 is a diagram showing an example of the real tape volume group record format of a real tape volume group information table stored in the virtual tape apparatus;

DESCRIPTION OF THE PREFERRED EMBODIMENT

A preferred embodiment of the storage apparatus of the present invention will be explained in detail with reference to FIG. 1 to FIG. 16.

Figure 1:
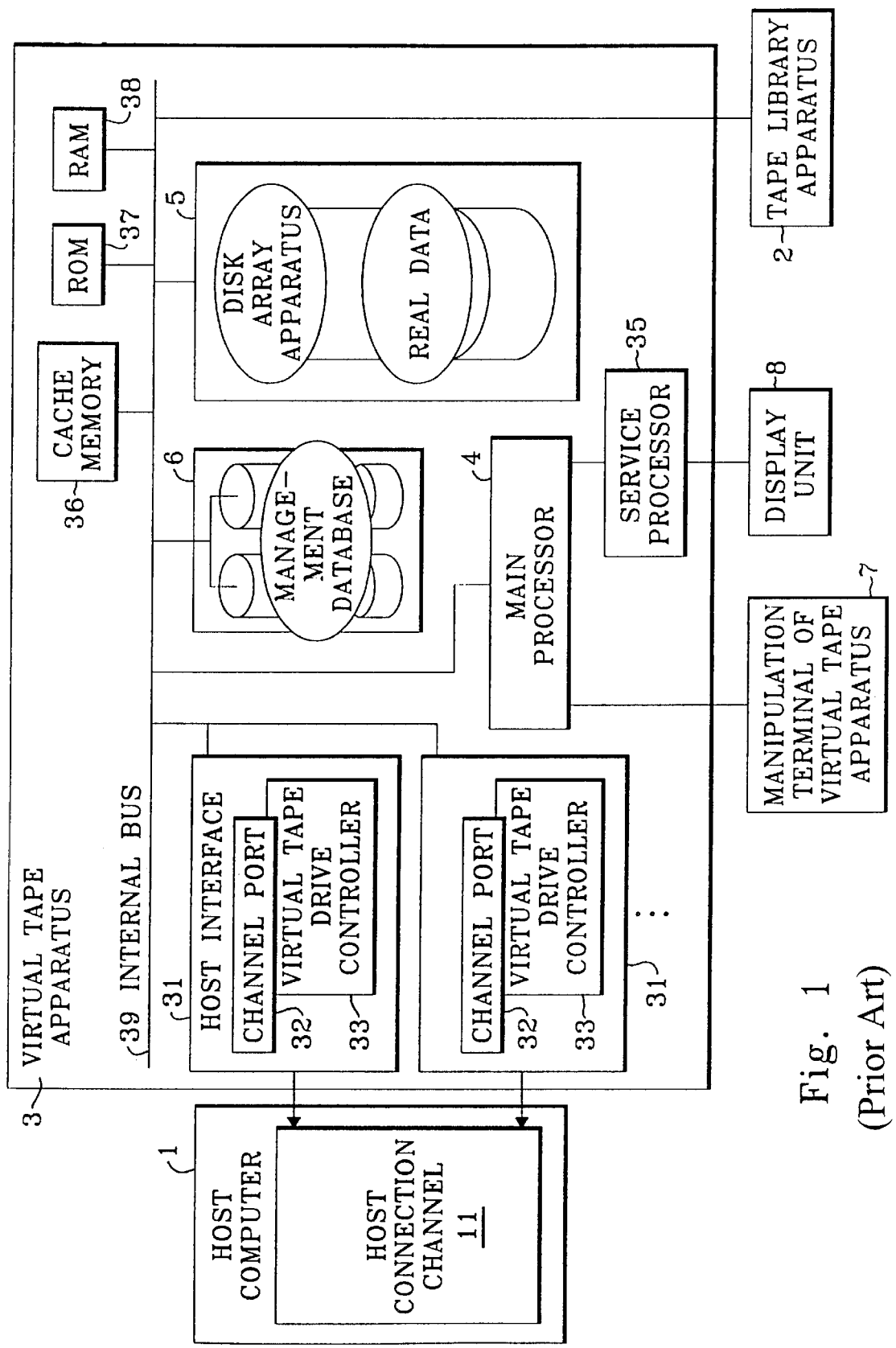
FIG. 1 is a block structure diagram showing an example of a computer system in which the storage apparatus of the present invention is applied to a virtual tape apparatus.

FIG. 1 is a block structure diagram showing an example of a computer system in which a storage apparatus of the present invention is applied to a virtual tape apparatus. In this computer system, a virtual tape apparatus 3 is connected between a host computer 1 and a tape library apparatus 2.

The host computer 1 is a host apparatus. The host computer 1 is provided with a host connection channel 11 for connecting to the virtual tape apparatus 3.

The tape library apparatus 2 is provided with a plurality of real tapes (not illustrated) and a drive (not illustrated) which is a driving mechanism for these real tapes.

The virtual tape apparatus 3 is provided with a host interface 31, a main processor 4, a disk array apparatus 5, a management database 6, a service processor 35, a cache memory 36, a ROM (Read Only Memory) 37, a RAM (Random Access Memory) 38, and an internal bus 39 for mutually connecting these elements.

Each host interface 31 has a channel port 32 and a virtual tape drive controller 33, and is connected to the host connecting channel 11 of the host computer 1. The virtual tape drive controller 33 executes control for the data received from the channel port 32.

The main processor 4 controls data transfer in the virtual tape apparatus 3 and executes management of information about the virtual tape volumes. Moreover, the main processor 32 also executes drive control in the tape library apparatus 2 when the tape library apparatus 2 is connected. Drive control includes, for example, loading/unloading of magnetic tape, feeding and rewinding of magnetic tape.

A data transfer control program and library apparatus control program to be executed in the main processor 4 are stored, for example, in the ROM 37 or disk array apparatus 5. To the main processor 4, a control instruction, etc. is input from an operator via a virtual tape apparatus manipulation terminal 7 such as a keyboard and mouse, etc.

The disk array apparatus 5 is composed, for example, of a hard disk apparatus. The disk array apparatus 5 is a virtual storage area for storing the virtual tape volumes. Moreover, the disk array apparatus 5 stores programs, etc. for controlling operation of the virtual tape apparatus 3.

The management database 6 is a database for management of the information, etc. recorded in the virtual tape volumes and real tape volumes.

The service processor 35 is provided for controlling a display unit 8 connected to the virtual tape apparatus 3. The service processor 35 executes display control for the condition of virtual tape apparatus 3 and information regarding the virtual tape volumes.

The cache memory 36 temporarily stores the data read from the virtual tape volumes and real tape volumes and the data written to the virtual tape volumes and real tape volumes to raise access efficiency. The ROM 37 stores the programs, etc. to control the data and operation of the virtual tape apparatus 3. The RAM 38 is used as the work area of the main processor 4 and service processor 35.

Figure 2:
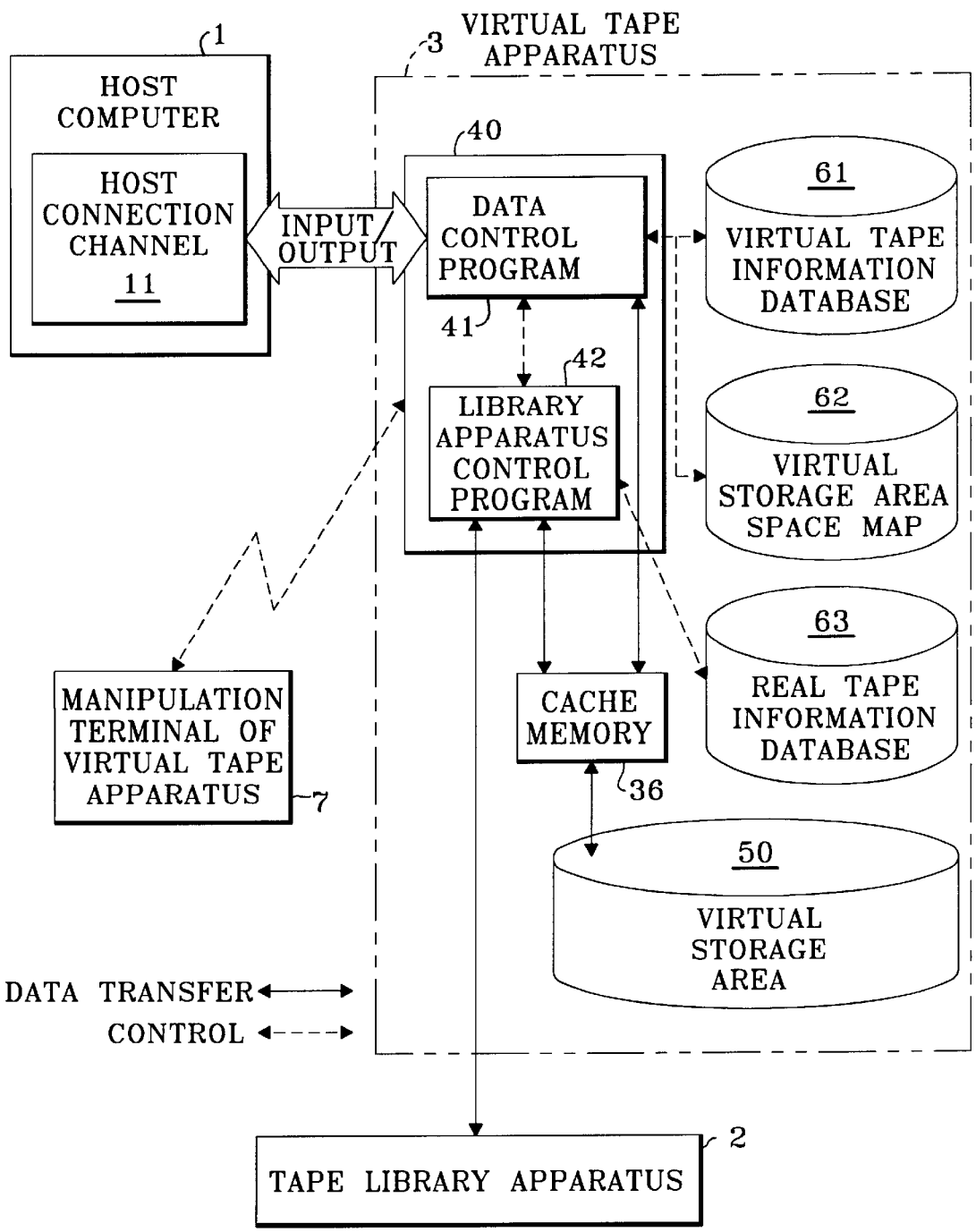
FIG. 2 is a block diagram for explaining the functions of a virtual tape apparatus to which the storage apparatus of the present invention is applied.

FIG. 2 is a block diagram for explaining functions of the virtual tape apparatus to which the storage apparatus of the present invention is applied. This virtual tape apparatus 3 comprises a control section 40 corresponding to the main processor 4 of FIG. 1, a virtual storage area 50 provided within the disk array apparatus 5 of FIG. 1, a virtual tape information database 61 provided within the management database or FIG. 1, a virtual storage area space map 62, a real tape information database 63 and a cache memory 36. The elements having the same functions as those of the elements shown in FIG. 1 are designated by like reference numerals.

The control section 40 executes the data transfer control program 41 and library apparatus control program 42. The data transfer control program 41 is a control program for recording the data transferred from the host computer 1 to the virtual tape volume of the virtual storage area 50 via the cache memory 36. Or, the data transfer control program 41 can be a control program for starting the library apparatus control program 42 to drive the tape library apparatus 2 in view of recording the data transferred from the host computer 1 to the real tape volume. In this case, the control section 40 refers to the virtual tape information database 61, virtual storage area space map 62 and real tape information database 63 or updates these elements.

Moreover, the data transfer control program 41 reads data from the virtual tape volume, cache memory 36 or real tape volume responding to the read request from the host computer 1 and then transfers the data to the computer 1.

The library apparatus control program 42 executes drive control for a robot which loads or unloads a magnetic tape cartridge and control for feeding or rewinding the tape by driving the feeding mechanism of the magnetic tape after it is loaded.

The virtual tape information database 61 stores the virtual tape volume information table. The virtual tape volume information table is composed of a tape volume information record in the format, for example, shown in FIG. 3. In FIG. 3, only two records are shown but one tape volume information record is generated for one virtual tape volume provided in the virtual storage area 50 (refer to FIG. 2).

Each record of the virtual tape volume information table shown in FIG. 3 has the "tape volume name" field indicating the name, for example, of a virtual tape volume, a "header information" field identical to the header information recorded on the real tape, a "total block size" field indicating a block size of the virtual tape volume, a "tape condition" field indicating whether or not the virtual tape volume is used, a "protect information" field indicating whether writing or not is inhibited, a "tape generation time" field indicating the time when the virtual tape volume is generated, a "final access time" field indicating the final access time of the virtual tape volume, a "final writing time" field indicating the final access time of the virtual tape volume for writing purposes, a "final mount time" field indicating the final mount time of the virtual tape volume, a "stage-out time" field indicating the stage-out time of the virtual tape volume, a "stage-out acknowledgment" field indicating the possibility of stage-out, a "number of times of mount" field indicating the number of times of mount of the virtual tape volume, and a plurality of "tape mark information" fields (in the example shown in the figure, (1) to (n)) indicating the position information of address pointers corresponding to the partition mark.

A value stored in the "total block size" is added for all virtual tape volumes. This value is compared with the capacity of virtual storage area 50 in order to know the remaining capacity of the virtual storage area 50. Namely, the remaining capacity of the virtual storage area 50 can be detected by adding the values of the "total block size" fields of all virtual tape volumes and then subtracting this added value from the capacity of the virtual storage area 50.

Moreover, the virtual tape information database 61 stores, for example, the virtual tape volume group information table consisting of the virtual tape volume group records having the format shown in FIG. 4. Only two records are indicated in FIG. 4 but one virtual tape volume group record is respectively generated for each preset group.

Each record of the virtual tape volume group information table shown in FIG. 4 has, for example, the "group name" field indicating the name of the group, a plurality of "tape volume name" fields (in the example of the figure, (1) to (n)) indicating one by one the names of the virtual tape volumes belonging to this group, the "final access time" field indicating the time when any one of the virtual tape volumes belonging to this group is accessed finally, the "write destination" field indicating the writing destination when the virtual tape volume belonging to this group is written to the real tape volume, and the "writing mode" field indicating whether the virtual tape volume is written into the real time volume in the concentrated mode or distributed mode, namely whether or not multi-filing should be done.

Figure 5:
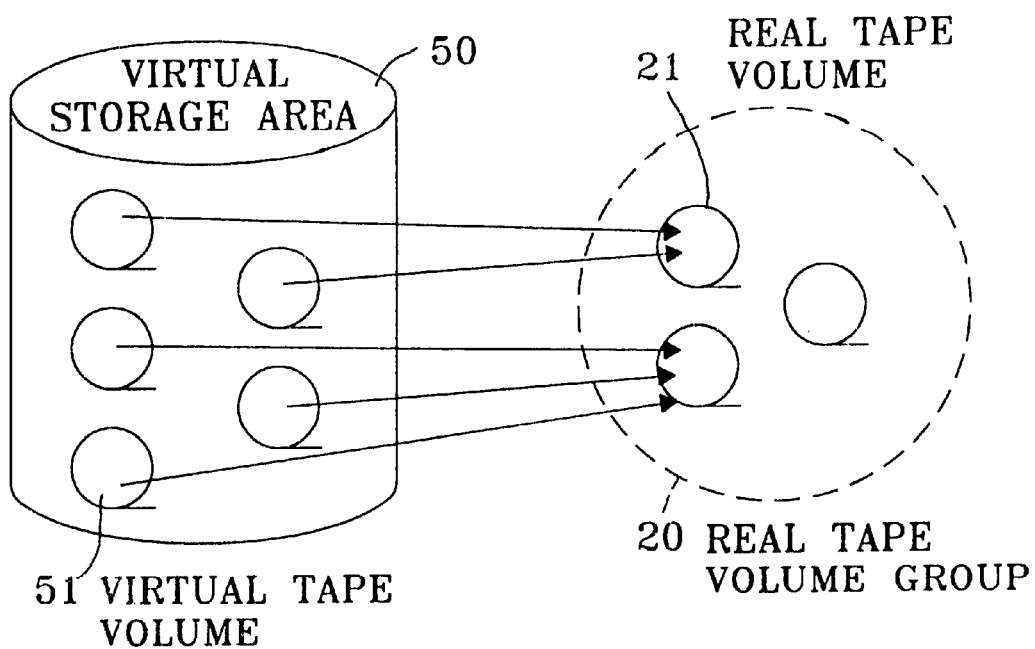
FIG. 5 is a conceptual diagram for explaining the writing of a virtual tape volume in the centralized writing mode of the virtual tape apparatus.
Figure 6:
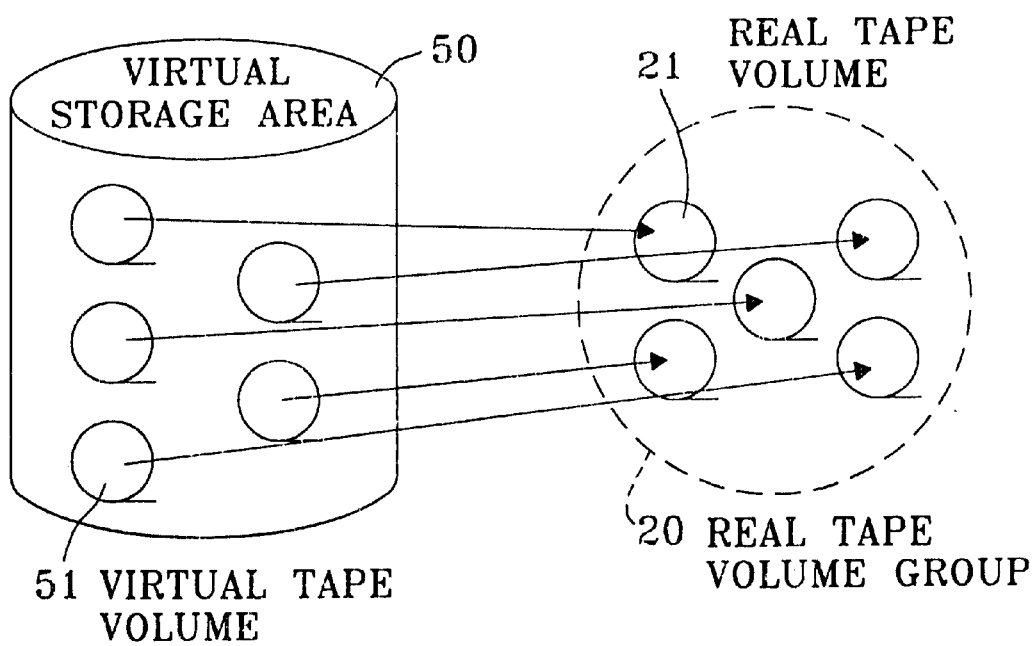
FIG. 6 is a conceptual diagram for explaining writing of a virtual tape volume in the distributed writing mode of the virtual tape apparatus.

FIG. 5 and FIG. 6 respectively show the concept of the writing of the virtual tape volumes in the two writing modes for the real tape volumes. Two writing modes include the concentrated writing mode and the distributed writing mode. In the concentrated writing mode of FIG. 5, a plurality of virtual tape volumes 51 are stored in the form of multi-files into one real tape volume 21. Therefore, in the concentrated writing mode, the number of real tape volumes 20 can be reduced and thereby the tape library apparatus 2 can be reduced in size. Moreover, the concentrated writing mode is suitable for writing of the virtual tape volume used for backup of the information.

Meanwhile, in the distributed writing mode shown in FIG. 6, only one virtual tape volume 51 is stored into a volume of the real tape volume 21. Therefore, in the distributed write mode, the virtual tape apparatus enables simultaneous access to the real tape volumes up to the number of drives in the tape library apparatus. Therefore, the distributed writing mode is suitable for storing, to the real tape volume, a plurality of virtual tape volumes which may be read simultaneously. Moreover, when the distributed writing mode is employed, it is possible to read the data from the real tape volume 21 even in the tape library apparatus, for example, to which the present invention is not applied.

The real tape information database 63 stores the real tape volume group information table. The real tape volume group information table is composed, for example, of the real tape volume group record having the format shown in FIG. 7. In FIG. 7, only two records are shown, but the real tape volume group record is generated one by one for each preset group.

Each record of the real tape volume group information table shown in FIG. 7 includes, for example, the "group name" field indicating the name of the group, a plurality of "real tape volume name" fields (in the example shown in the table, (1) to (n)) indicating one by one the names of the real tape volumes belonging to this group, a "write mode" field indicating that the virtual tape volume should be written to the real tape volume, for example, after the virtual tape volume is compressed or without compression, and a "final access time" field indicating the final access time to this group. The group name stored in the "group name" field of the real tape volume group information table is stored in the "writing destination" field of the virtual tape volume group information table.

Here, if the real tape is not grouped and a plurality of virtual tape volumes are only multi-filed (for example, in the sequence of generation of the write request) and are then stored into a plurality of real tape volumes, the following disadvantages are generated in some cases. Namely, when the host computer generates simultaneously the data read requests to a plurality of virtual tape volumes which are simply multi-filed, these requests must be first developed to the virtual storage area from the real tape. If not, the virtual tape apparatus cannot access these virtual tape volumes. Therefore, the time required for access of the virtual tape apparatus becomes considerably long, resulting in deterioration of efficiency.

In this embodiment, the group is defined respectively in the virtual tape volume and real tape volume as explained above. In this embodiment, such disadvantages can be eliminated, therefore, by selecting the writing mode of the virtual tape volume, namely whether the virtual tape volume is written in the concentrated writing mode or distributed writing mode to the real tape volume.

The tape group used for the backup process job usually has a common attribute. Simultaneously with starting of the backup process job, these tape volumes are frequently mounted and a large amount of data is written. Moreover, the tape group used in the backup job has the property that only the writing operation is executed except for the case where the recovery process due to losing of the data is conducted (for example, one in every day, in every week or in every month).

Considering such property, in this embodiment, the virtual tape volumes are grouped as explained above on the basis of the attribute of the tape volume in order to shorten as much as possible the backup job time. When the host computer 1 has issued the write request to any one of the grouped virtual tape volumes, the virtual tape apparatus 3 writes the virtual tape volume having a low application frequency to the real tape volume (stage-out). The virtual tape apparatus 3 acquires as much vacant capacity as possible in the virtual storage area 50 for the purpose of writing. Thereby, the writing operation from the host computer 1 can be done at a high speed.

On the other hand, when the host computer 1 has issued a read request to any one of the grouped virtual tape volumes, the virtual tape apparatus 3 executes prereading, as preparation, to the virtual storage area 50 from the real tape volume before the read request is actually received, even for the remaining virtual tape volumes in the group (this process is called pre-stage-in).

It is also possible to set the stage-out date as one attribute of the virtual tape volume. When the virtual tape volume is used as a medium for backup, a short stage-out date (for example, "0") is set. It is recommended here that during the backup job, writing be conducted at a high speed to the virtual storage area 50, and after the backup process, the recovered virtual tape volume is quickly written to the real tape volume. Thereby, waste of storage area of the disk array apparatus 5 can be reduced or eliminated.

Moreover, when the virtual tape volume is used as a storage medium in the temporary batch job, it is recommended that the stage-out period be set longer. The virtual tape volume group used for batch jobs has a higher possibility for frequent access and therefore when the storing period in the virtual storage area 50 is longer, access efficiency may be improved. This is because when the virtual tape volume used for the batch job is staged out, longer time is required for processing. Namely, the virtual tape apparatus is required to execute the processes, for the read request from the host computer, that the data is read from the real tape volume, developed to the virtual tape volume and transferred to the host computer.

When the virtual tape volume is used for temporary data (namely a storage medium for storing temporary data), it is possible to set the purge period as one attribute of the virtual tape volume. The temporary data is generated temporarily during the job and is used. This data is not required to be guaranteed. Therefore, when this temporary data is stored in the virtual storage area 50 for a long period, this condition itself results in waste of the virtual storage area. Therefore, it is recommended that the purge period be set and the data whose purge period has expired be automatically deleted.

In addition, for the virtual tape volume which is regularly read in the predetermined date and time (for example, "8 o'clock of Monday in every week"), the attribute may be set to make effective the function that when the virtual tape volume is staged out, it is previously read a little before the predetermined date and time are expired (pre-stage-in) and it is then developed in the virtual storage area 50. Thereby, access efficiency may be improved.

Figure 8:
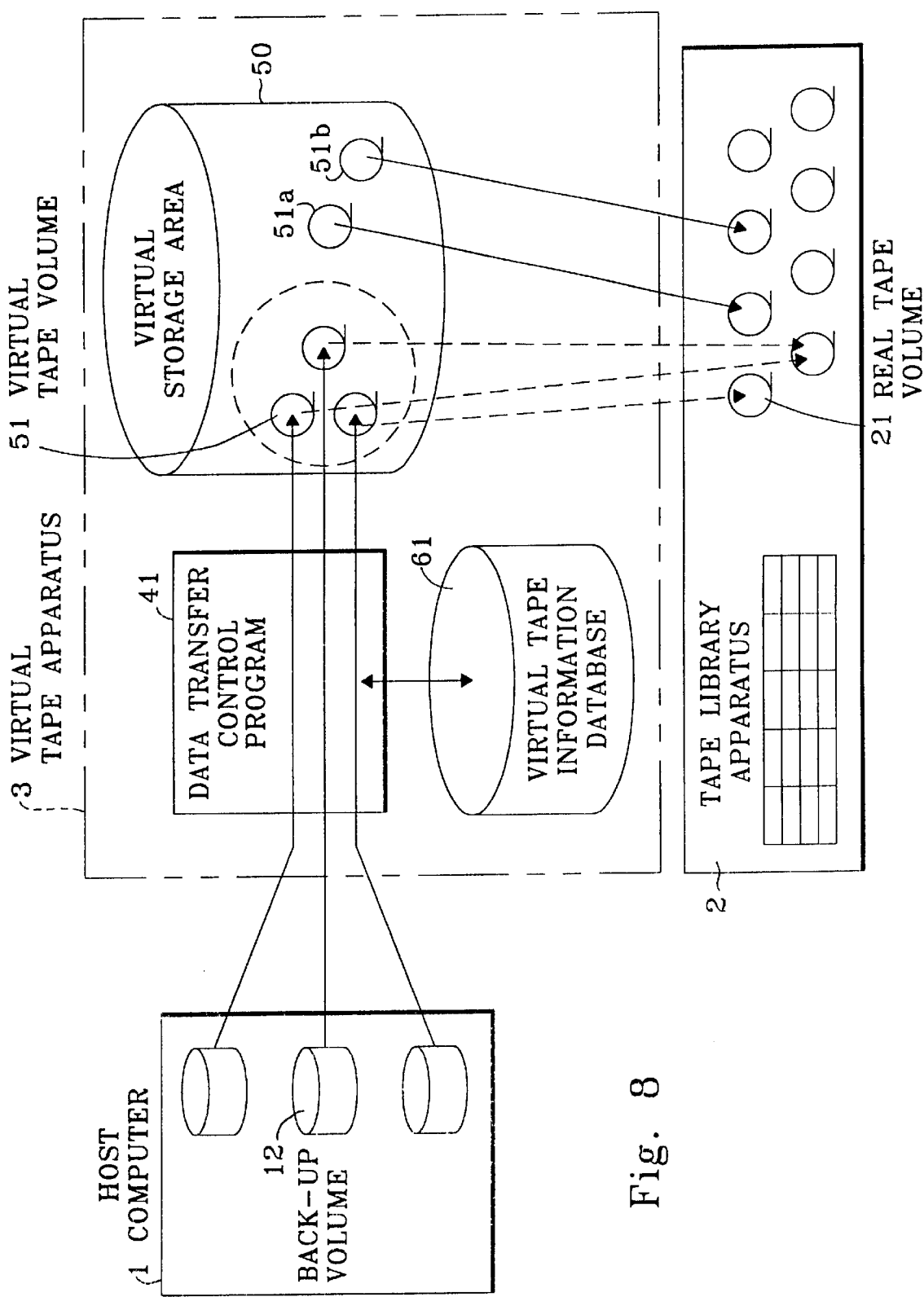
FIG. 8 is a diagram showing the data write process in the virtual tape apparatus.

Next, operation of the virtual tape apparatus 3 in the computer system to which the virtual tape apparatus 3 of this embodiment is applied will be explained. FIG. 8 is a schematic diagram showing the concept of the data writing process in the virtual tape apparatus 3. A group consisting of three virtual tape volumes 51 belonging to the same group is enclosed by a broken line in the virtual storage area 50 of FIG. 8.

Figures 9, 9A:
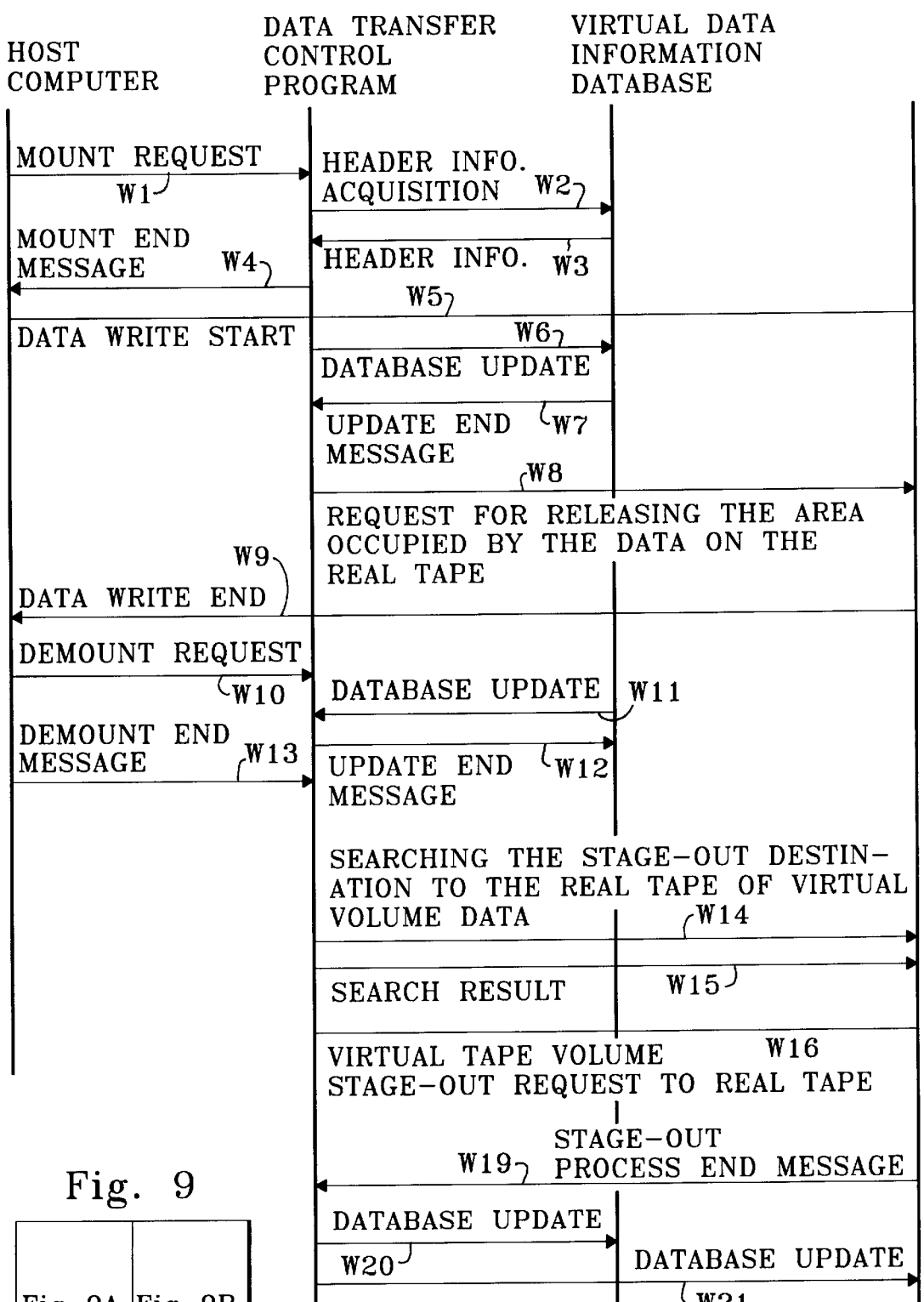
FIGS. 9A and 9B are diagrams for explaining the operation of the data write process in the virtual tape apparatus.
Figure 9B:
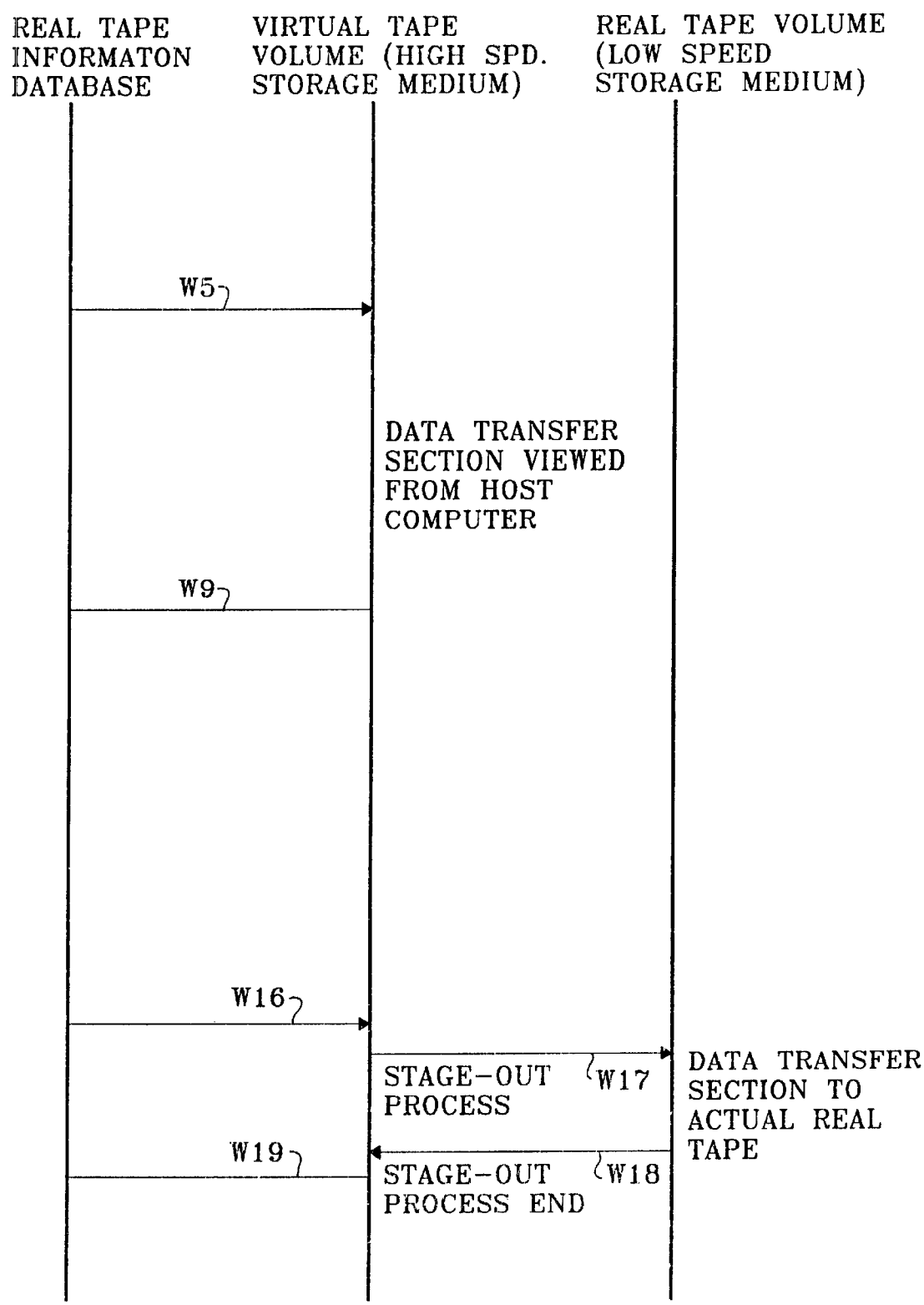

FIG. 9 is a diagram for explaining operation of the data writing process.

When the process to recover the backup volume 12 in the host computer 1 to the tape library apparatus 2 is started, the host computer 1 issues the mount request to any one of the grouped virtual tape volumes 51. The data transfer control program 41 of the virtual tape apparatus 3 accepts the mount request (step W1 in FIG. 9). The data transfer control program 41 issues, to the virtual tape information database 61, a tape header information acquisition request to acquire the tape header information required for the requested mount process of the virtual tape volume 51 (step W2 in FIG. 9). The data transfer control program 41 acquires the tape header information database 61 (step W3 in FIG. 9). Thereby, the data transfer control program 41 immediately completes the virtual mount. The data transfer control program 41 then sends the mount end message to the host computer 1 (step W4 in FIG. 9).

When the write request is issued to this virtual tape volume 51 immediately after the mounting, the data transfer control program 41 sequentially writes data to the virtual storage area 50 (step W5 in FIG. 9) to complete the data writing (step W9 in FIG. 9). The data transfer control program 41 also deletes, in parallel to continuation of the data writing operation, the preceding data existing on the virtual tape volume 51. Therefore, the data transfer control program 41 deletes the information regarding the preceding data on the virtual tape information database 61 to update it (step W6 in FIG. 9). Here, the virtual tape information database 61 receives a database update end message from the virtual tape information database 61 (step W7 in FIG. 9). Moreover, the data transfer control program 41 outputs a data occupation area release request on the real tape to the real tape information database 63 (step W8 in FIG. 9). When writing is conducted immediately after the mounting, all data written previously is canceled.

The period of the steps W5 to W9 becomes the data transfer period viewed from the host computer 1.

Upon completion of the data writing, the host computer 1 outputs a demount request to the data transfer control program 41 (step W10 in FIG. 9). The data transfer control program 41 which has received the demount request updates the related field of the virtual tape information database 61 (step W11 in FIG. 9). Moreover, the data transfer control program 41 receives a database update end message from the virtual tape information database 61 (step W12 in FIG. 9). Here, the data transfer control program 41 sends the demount end message to the host computer 1 (step W13 in FIG. 9).

Thereafter, when the setting time of the stage-out period, which is one attribute of the virtual tape volume 51, has passed, the data transfer control program 41 writes (stage-out) the data of virtual tape volume 51 to the real tape. For this purpose, the data transfer control program 41 searches the real tape information database 63 (step W14 in FIG. 9). Here, the data transfer control program 41 receives a search result from the real tape information database 63 (step W15 in FIG. 9). The data transfer control program 41 also outputs a stage-out request to the virtual tape volume 51 (step W16 in FIG. 9). The virtual tape volume 51 is staged out to the real tape on the basis of the stage-out request (step W17 in FIG. 9).

When the stage-out process is completed (step W18 in FIG. 9), the virtual tape volume 51 sends a stage-out process end message to the data transfer control program 41 (step W19 in FIG. 9). The data transfer control program 41 receives this stage-out process end message. This data transfer control program 41 updates the related fields of the virtual tape information database 61 and real tape information database 63 (steps W20, W21 in FIG. 9) to complete a series of processes.

The period of the steps W17 to W18 becomes the actual data transfer period to the real tape.

Here, for the other virtual tape volumes 51 belonging to the same group as the virtual tape volume 51 to which the writing is conducted, it is useless to conduct the pre-stage-in process (previous read) to the virtual storage area 50 from the real tape volume 21. This is because these virtual tape volumes 51 have a higher probability for the similar subsequent writing process. The data transfer control program 41 judges this probability and controls the stage-in of the other virtual tape volumes 51 of the same group.

Moreover, since the resource of the virtual storage area 50 as a high speed storage medium is finite, if the vacant capacity of the virtual storage area 50 becomes short during the back-up operation, the virtual tape apparatus must temporarily interrupt the back-up process to write the data of the virtual tape volume which is not required immediately to the real tape area (stage-out). In this embodiment, in order to avoid interruption of the backup process, the virtual tape apparatus starts the stage-out process of the data of unnecessary virtual tape volumes 51a, 51b (refer to FIG. 8) in the virtual storage area 50 when the write request is generated to one virtual tape volume 51 within a certain group. This process is simultaneously conducted in the background so as to not generate any influence on the write process of the host computer 1.

Figures 10, 10A:
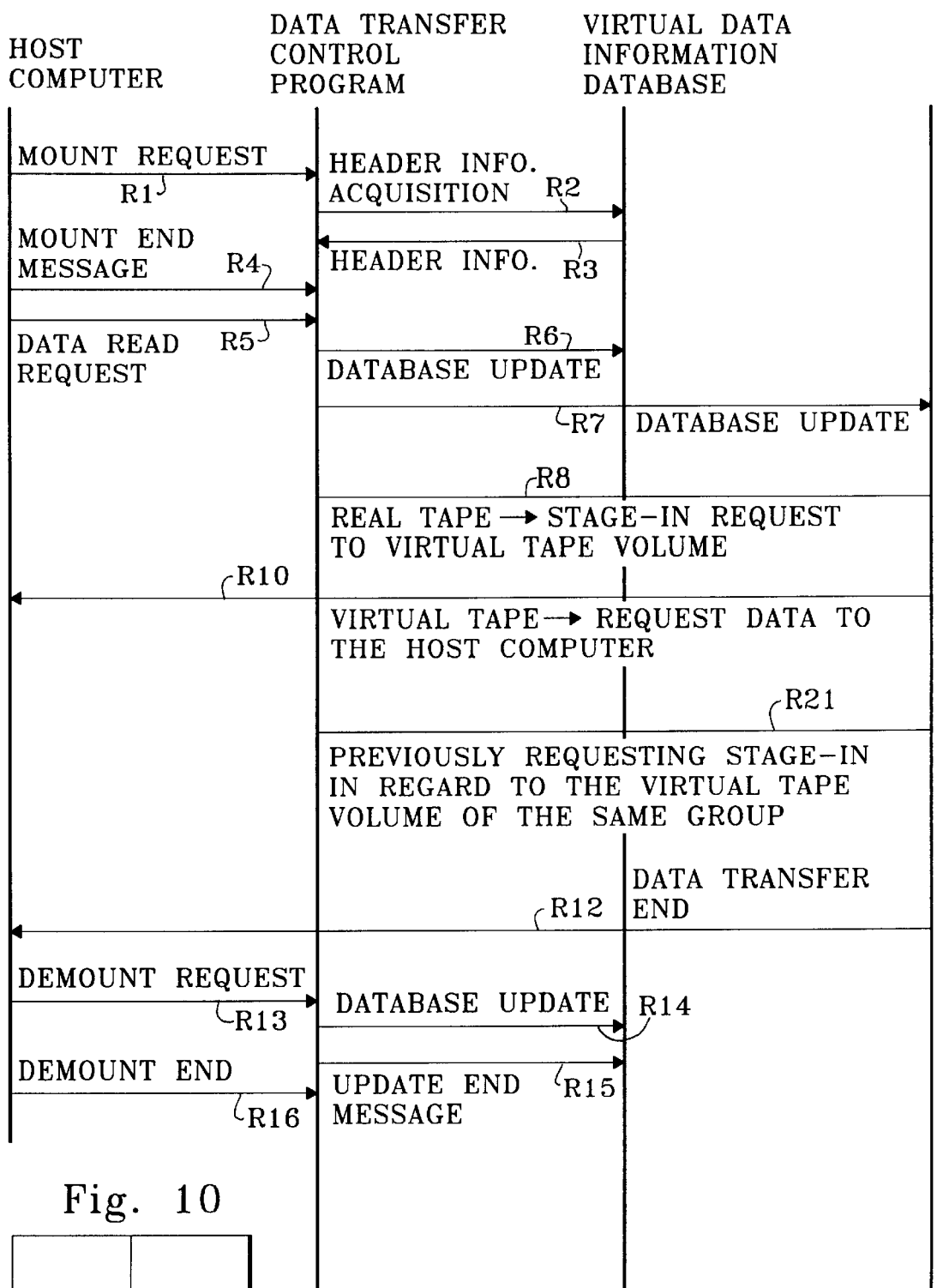
FIGS. 10A and 10B are diagrams for explaining the operation of the data read process in the virtual tape apparatus.
Figure 10B:
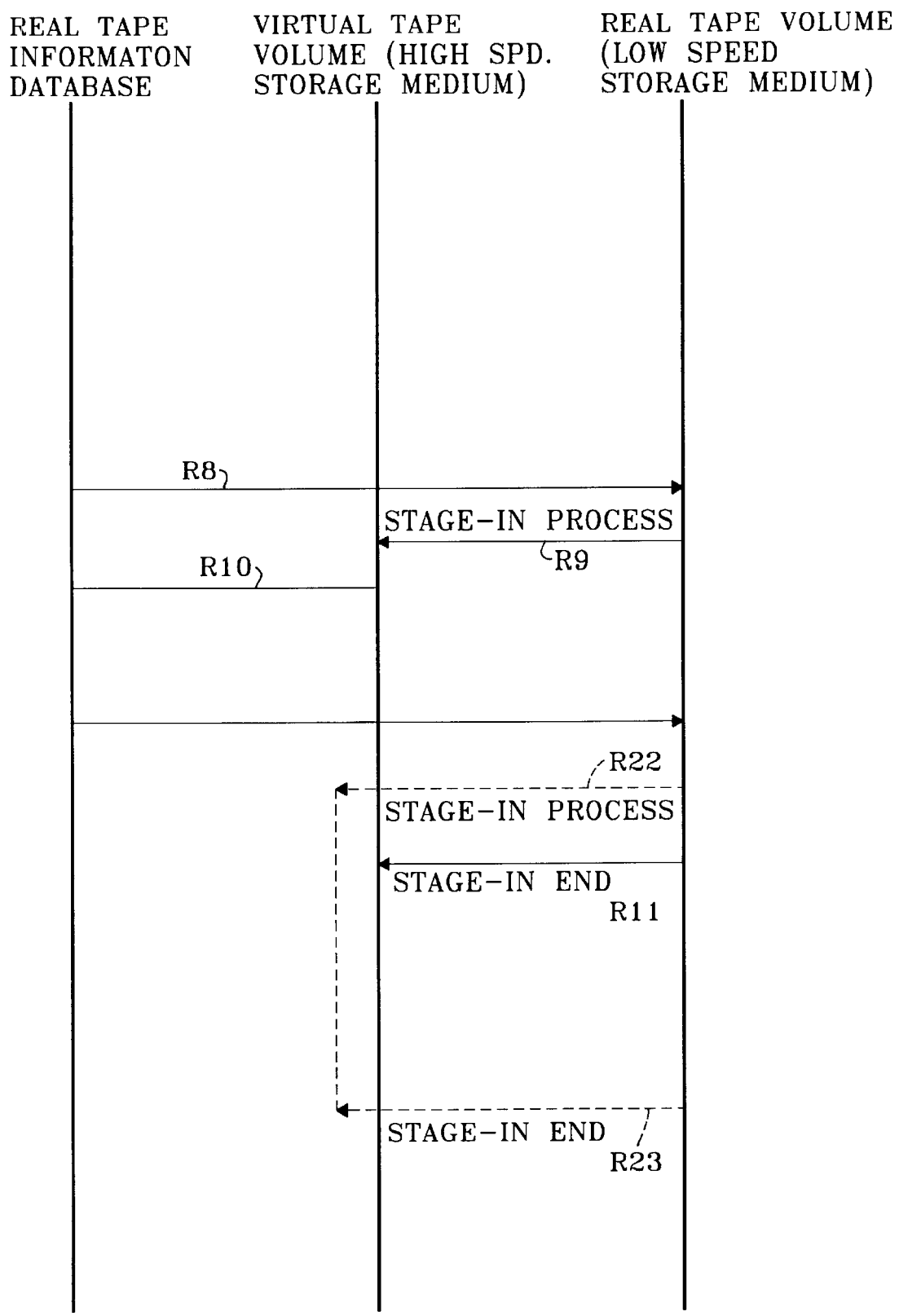

FIG. 10 is a diagram for explaining operation of the data read process in the virtual tape apparatus 3. When the read operation of the data staged out to the real tape volume 21 is started, the host computer 1 issues a mount request to a certain virtual tape volume 51. The data transfer control program 41 accepts such mount request (step R1) and tries to acquire the tape header information, etc. required for the requested mount process of the virtual tape volume 51. For this purpose, the data transfer control program 41 issues a tape header information acquiring request to the virtual tape information database 61 (step R2). Thereby, the data transfer control program 41 acquires the tape header information from the virtual tape information database 61 (step R3) to immediately complete the virtual mount. Here, the data transfer control program 41 sends a mount end message to the host computer 1 (step R4).

Thereafter, the host computer 1 issues a data read request to the data transfer control program 41 (step R5). Thereby, the data transfer control program 41 receives this data read request and updates the related fields of the virtual tape information database 61 and real tape information database 63 (steps R6, R7). Here, the data transfer control program 41 stages in the data to the virtual tape volume 51 from the real tape. The data transfer control program 41 outputs a stage-in request to the real tape volume 21 (step R8).

Upon receiving the stage-in request, the real tape volume 21 starts the stage-in process to the virtual tape volume 51 (step R9). Thereafter, the real tape volume 21 completes the stage-in process (step R11). The virtual tape volume 51 transfers, in parallel to the stage-in process, the request data to the host computer 1 from the virtual tape volume 51 (step R10). Next, the virtual tape volume 51 completes the data transfer (step R12).

Upon completion of the data read operation, the host computer 1 outputs a demount request to the data transfer control program 41 (step R13). The data transfer control program 41 which has received the demount request updates the related fields of the virtual tape information database 61 (step R14). Upon reception of the database update end message from the database 61 (step R15), the data transfer control program 41 sends the demount message to the host computer 1 (step R16). Thereby, a series of processes are completed.

Moreover, when the data requested from the host computer 1 is staged in to the virtual tape volume 51 from the real tape volume 21, the virtual tape apparatus conducts, in parallel to such process (and immediately after such process) the pre-stage-in process to the virtual storage area 50 for the other real tape volume belonging to the same group as the request data, to develop the data on the virtual storage area 50 (steps R21 to R23).

In general, when a tape volume which is used periodically at a certain time exists, the other tape volumes which have been used near the time when such tape volume is used have a considerably higher probability for use in pair with each other. Therefore, for improvement of access efficiency, it is recommended to conduct the pre-stage-in of the tape volumes having the higher probability for simultaneous use to the virtual tape volume 51 (high speed storage medium) from the real tape volume 21. For this purpose, it is necessary to acquire vacant area in the virtual storage area 50. Therefore, in this embodiment, the virtual tape apparatus 3 sets appropriate conditions of the virtual tape volume 51 as the object of the stage-out process. The virtual tape apparatus 3 also has a function to automatically stage out the virtual tape volumes satisfying the conditions.

In the case where there are tape volumes which have been used near the same time as a certain tape volume, when the virtual tape volume 51 for one tape volume among these volumes is considered as the object of the stage-out, the virtual tape volume 51 for the other tape volume is also considered as the object of stage-out.

For example, the condition for conducting automatic stage-out may be set as the tape volume 51 which is the oldest tape volume, where the final access has been made for the write process. Such data has a much higher probability for non-recording of the same data to the real tape volume 21. Therefore, there is a fear of losing data unexpectedly even such as by a crash (destruction) of the disk array apparatus 5. Accordingly, such data must be staged out with the highest priority.

Figure 11:
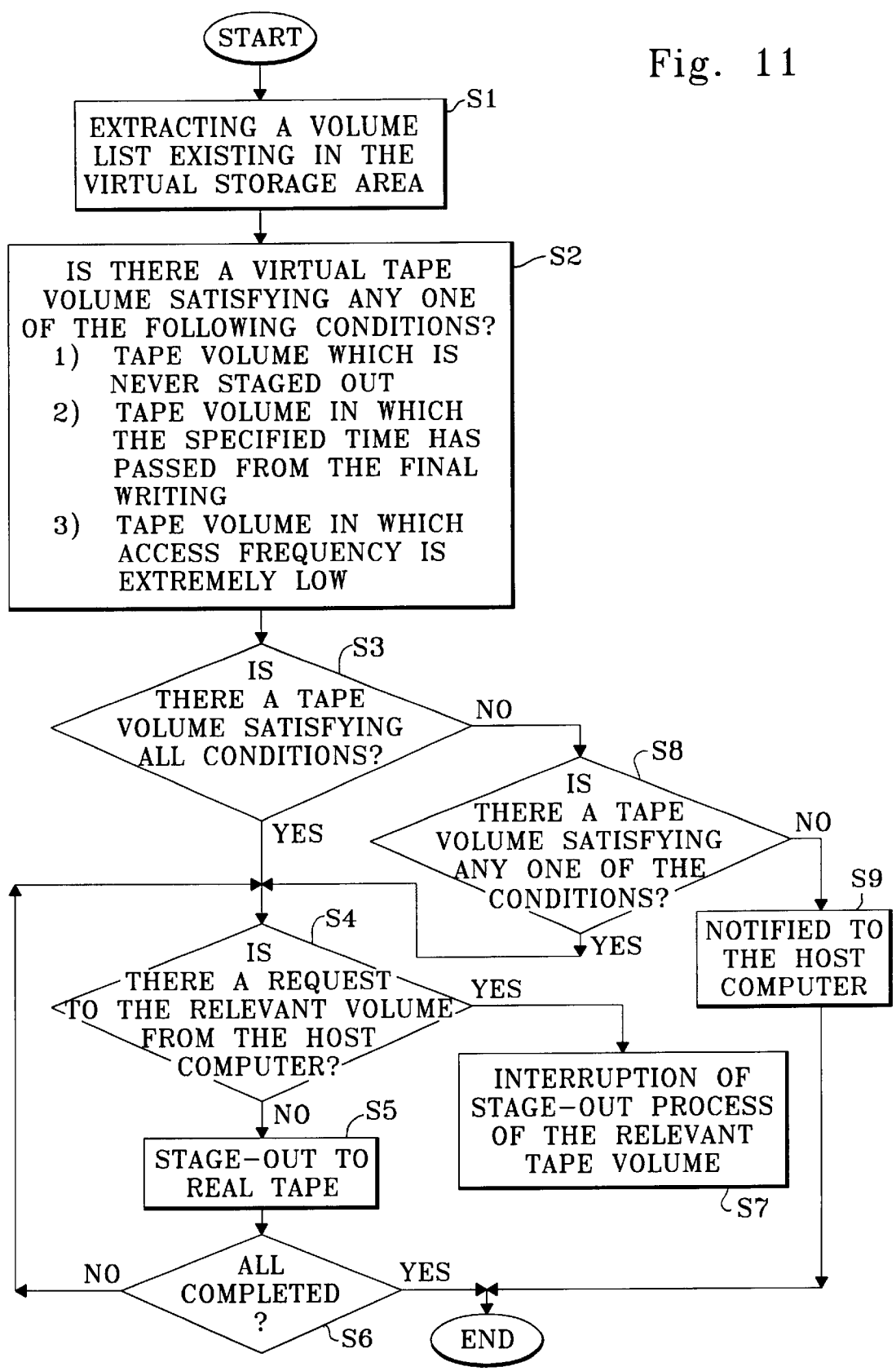
FIG. 11 is a flowchart showing the automatic stage-out (write) process in the virtual tape apparatus.

FIG. 11 is a flowchart showing the automatic stage-out process explained above. When the automatic stage-out process is started, the data transfer control program 41 refers to the "stage-out acknowledgment" field (refer to FIG. 3) of each record in the virtual tape volume information table stored in the virtual tape in formation database 61. The data transfer control program lists up the virtual tape volume 51 which is allowed to conduct the stage-out in the virtual tape volume 51 existing in the current virtual storage area 50 (step S1).

The data transfer control program 41 extracts the virtual tape volume satisfying the conditions (1), (2), (3) explained below among the virtual tape volumes 51 listed up (step S2).

(1) Virtual tape volume which is not yet staged out, namely the virtual tape volume in which the "stage-out time" field of FIG. 3 is not set.

(2) Virtual tape volume which has passed the time specified previously by a user after the final writing, namely virtual tape volume in which the time up to the current time from the time stored in the "final writing time" field in FIG. 3 has passed the specified time (for example, 48 hours).

(3) Virtual tape volume which has been staged in the virtual storage area 50 for the read operation but has extremely lower access frequency, namely virtual tape volume in which the time stored in the "final mount time" field of FIG. 3 is not the latest time and a value stored in the "number of times of mount" field is extremely low.

When there is a virtual tape volume 51 satisfying all conditions of (1) to (3)(step S3), the data transfer control program 41 stages out the virtual tape volume 51 to the real tape volume 21 (step S5) when the host computer 1 does not issue an access request to the virtual tape volume 51 (step S4). When there are remaining virtual tape volumes 51 listed up in the step S2 (step S6), the data transfer control program 41 returns to the step S4. The data transfer control program 41 thereafter repeats the processes of step S4 to S6 for all virtual tape volumes 51 listed up. When all virtual tape volumes 51 are staged out in the step S6, the data transfer control program 41 completes the automatic stage-out end process.

However, when the host computer 1 issues an access request to the virtual tape volume 51 to be staged out in step S4, the stage-out process to the virtual tape volume 51 is interrupted (step S7).

If sufficient vacant area cannot be acquired in the virtual storage area 50 even by the processes in steps S1 to S7, or there is no virtual tape volume 51 satisfying all conditions of (1) to (3) in the step S3, the data transfer control program 41 lists up tile virtual tape volume 51 satisfying at least one of the conditions (1) to (3) (step S8). Then, the data transfer control program 41 executes the processes of the steps S4 to S7 for the virtual tape volume 51 listed up and then completes the automatic stage-out process.

If there is no virtual tape volume 51 satisfying any one of the conditions (1) to (3) in the step S8, the data transfer control program 41 sends a message to the host computer 1 (step S9) and completes the automatic stage-out process. In this case, a display unit 8 connected to the virtual tape apparatus 3 and a display unit (not illustrated) of the host computer 1, for example, are caused to display the list of the virtual tape volumes 51 in the virtual storage area 50. Here, a user can operate a manipulation terminal 7 of the virtual tape apparatus and manipulation terminal (not illustrated) of the host computer 1 by referring to the list and selecting the virtual tape volume 51 to be staged out.

Figure 12:
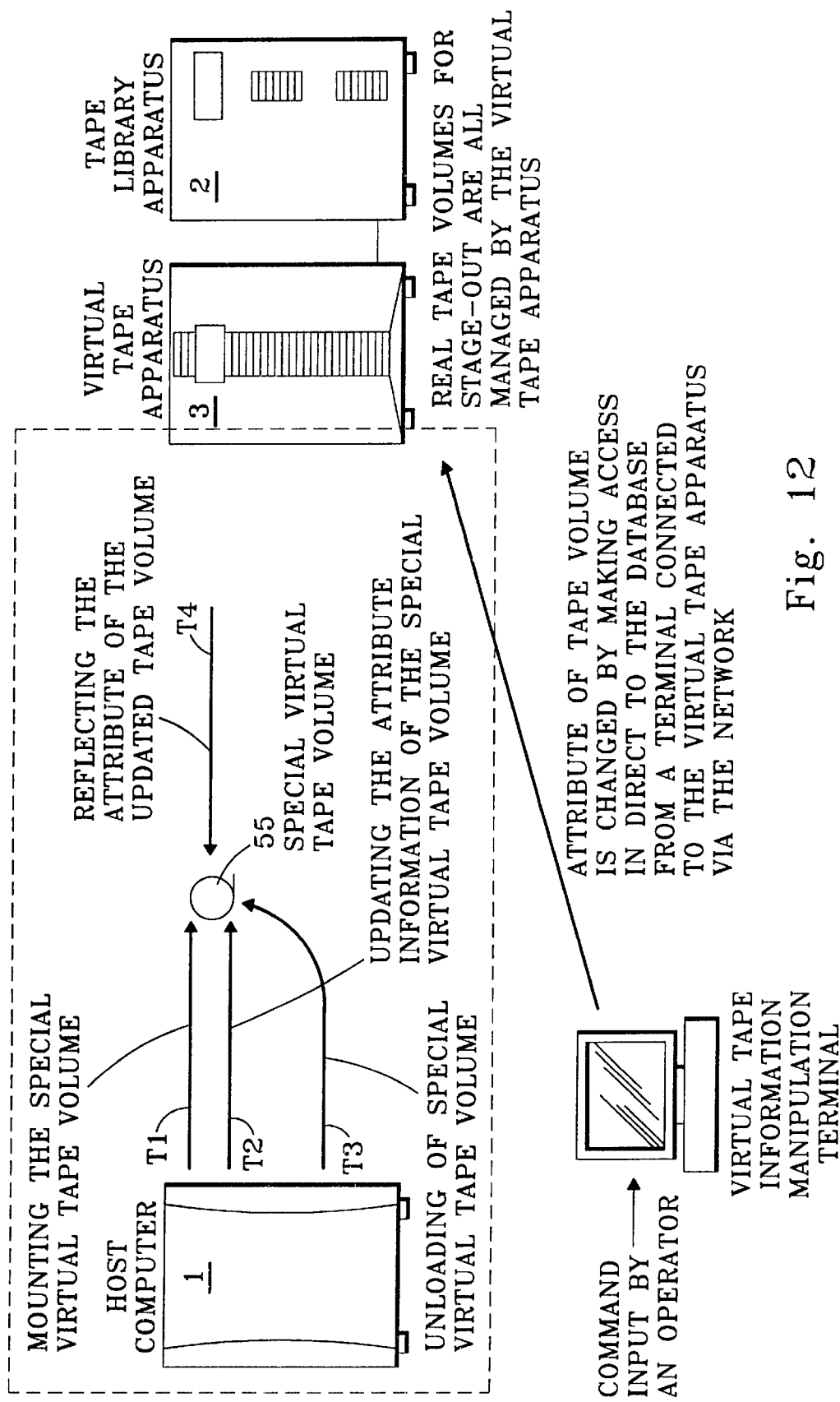
FIG. 12 is a diagram for explaining attribute information of a virtual tape volume in the virtual tape apparatus.

Next, the attributes of the virtual tape volume 51 will be explained. As explained above, in this embodiment, the data transfer control program 41 of the virtual tape apparatus 3 groups the virtual tape volumes 51 based on the attributes of the virtual tape volumes 51. FIG. 12 is a schematic diagram for explaining the attribute information of the virtual tape volumes 51. In this embodiment, special virtual tape volumes 55 (hereinafter referred to as special tape volumes 55) are stored in the virtual storage area 50 of the virtual tape apparatus 3. In the special tape volume 55, attribute information of all virtual tape volumes 51 in the virtual storage area 50 is recorded completely.

An outline of the setting or change of the attribute information of the virtual tape volume 51 will be explained (details will be explained later).

First, the host computer 1 outputs a mount request of the special tape volume 55 to the virtual tape apparatus 3. This virtual tape apparatus 3 mounts the special tape volume 55 (step T1). Subsequently, the host computer 1 updates the attribute information regarding each virtual tape volume 51 described in the special tape volume 55 (step T2).

Thereafter, the host computer 1 outputs the demount request of the special tape volume 55 to the virtual tape apparatus 3. The virtual tape apparatus 3 demounts (unloads) the special tape volume 55 (step T3). The mount process and demount process of the special tape volume 55 are respectively identical to the mount and demount processes of the ordinary virtual tape volume 51. Thereafter, the virtual tape apparatus 3 refers to the special tape volume 55. Thereby, the virtual tape apparatus 3 reflects the updated attribute information on the record regarding each virtual tape volume 51 in the virtual tape volume information table (refer to FIG. 3) stored in the virtual tape information database 61 (step T4).

Here, it is also possible to change the attribute information of a record when a user (operator) inputs a command to the virtual tape apparatus 3 via the manipulation terminal 7 of the virtual tape apparatus connected to the network. The real tape volumes 21 used to stage out the virtual tape volume 51 from the virtual tape apparatus 3 are all placed under the management of the virtual tape apparatus 3.

Figure 13:
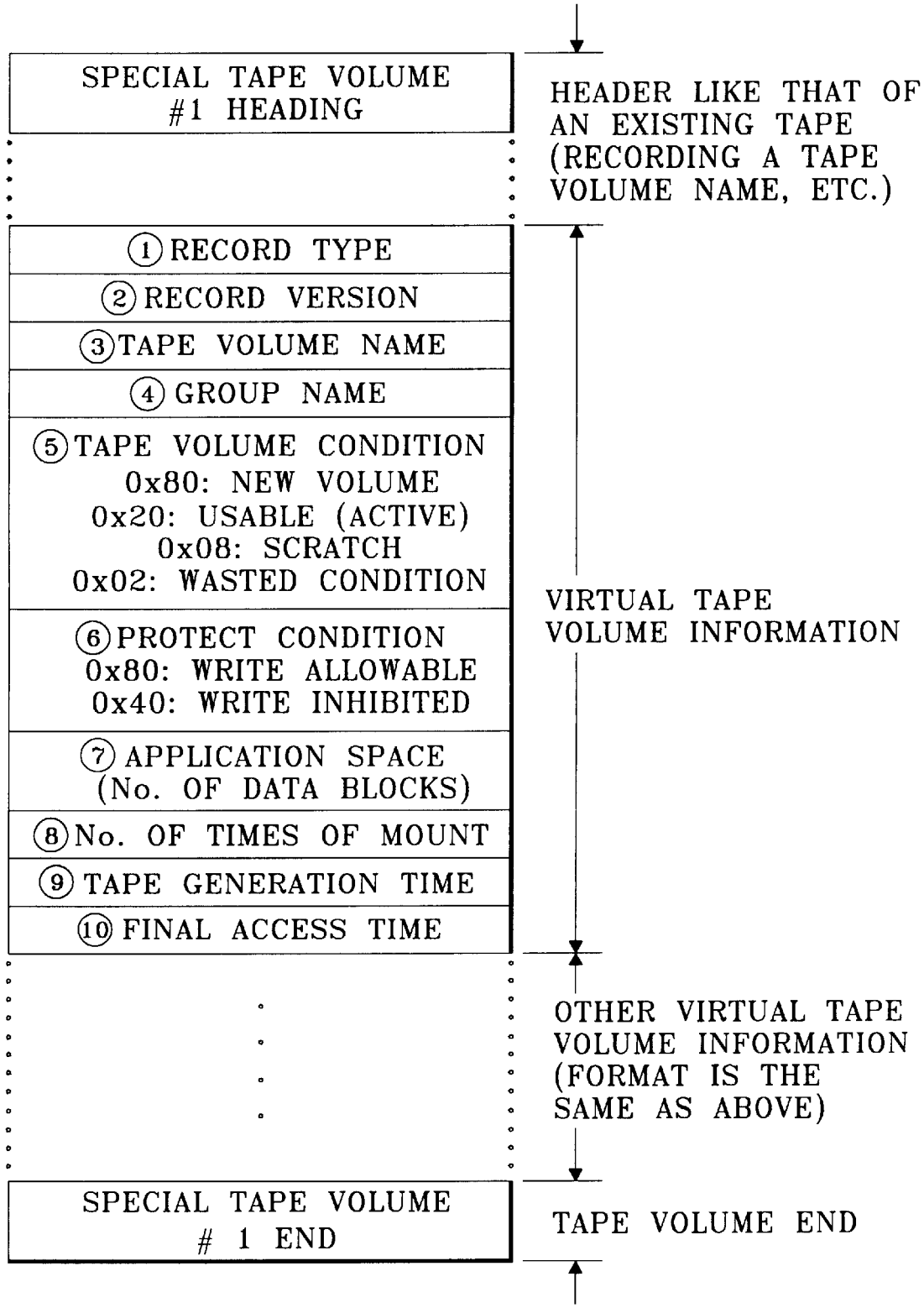
FIG. 13 is a diagram showing an example of the data format of special tape volume #1 in the virtual tape apparatus.
Figure 14:
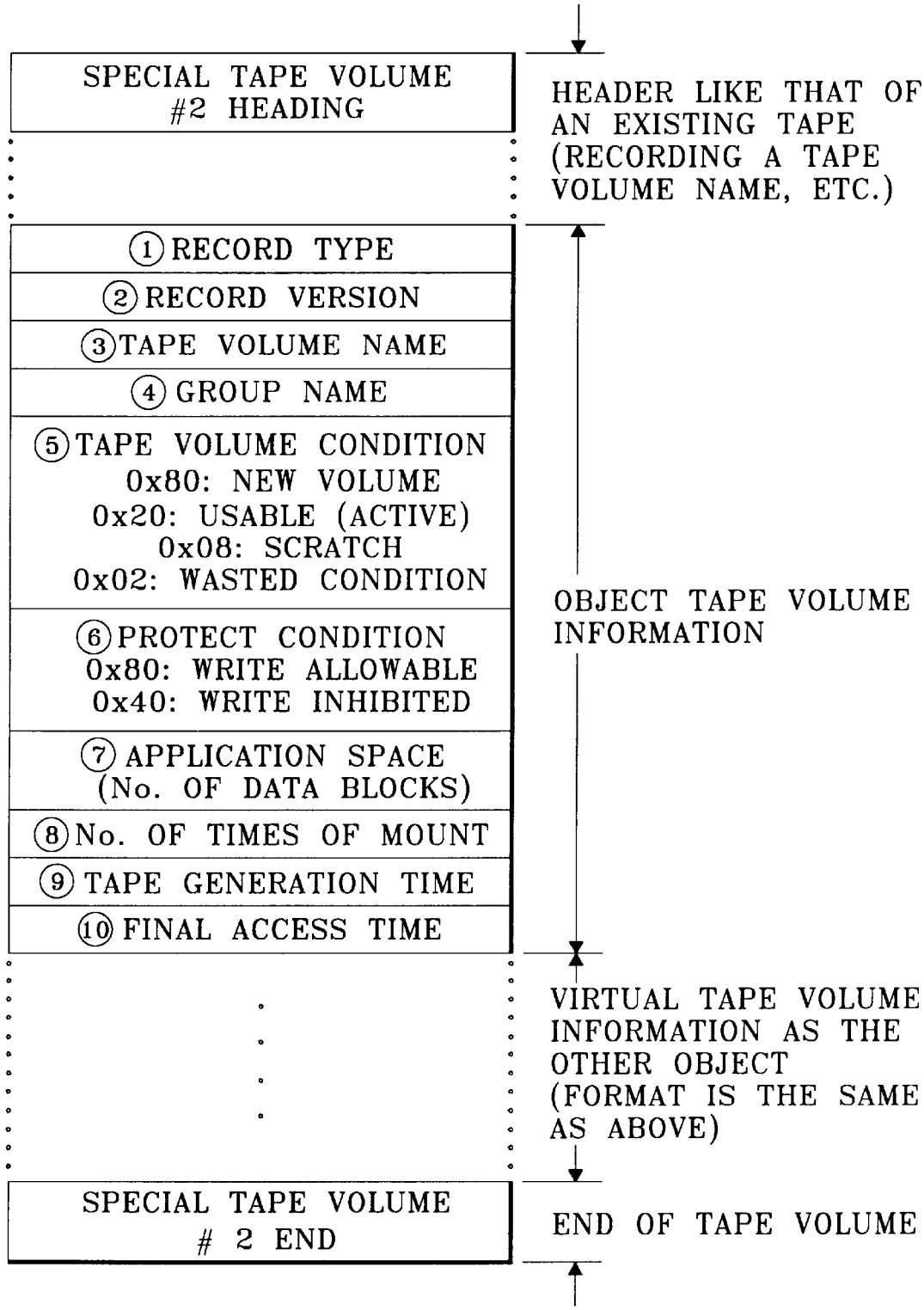
FIG. 14 is a diagram showing an example of the data format of special tape volume #2 in the virtual tape apparatus.

In this embodiment, as the special tape volume 55, for example, two special tape volumes for virtual tape volume list reference and virtual tape volume information update (respectively referred to as special tape volume #1 and special tape volume #2) are used. FIG. 13 and FIG. 14 respectively show examples of the data format of the special tape volume #1 and special tape volume #2.

An example of the data format of the special data volume #1 is shown in FIG. 13. Like the tape of the related art, the special tape volume #1 is formed of a "special data volume #1 heading" field as the header for recording a tape volume name, etc., a "record type" field indicating the meaning of the data, a "record version" field indicating a version of this data information (database), a "tape volume name" field indicating a tape volume name registered to the virtual tape apparatus 3, a "group name" field indicating the name of the group to which the tape volume indicated in the "tape volume name" field belongs, a "tape volume condition" field indicating the condition of the current tape volume, a "protect condition" field indicating write inhibit information of the tape volume, an "application space" field indicating the amount of data written to the tape volume, a "number of times of mount" field indicating the number of times of mount of the tape volume, a "tape generation time" field indicating the time when the tape volume is generated, a "final access time" field indicating the time when the tape volume is finally accessed, and a "special tape volume #1 end" field indicating the end of the tape volume.

Field 5 in FIG. 13 recognizes four conditions. "New volume" refers to volumes which are new or not used. "Usable" refers to volumes which have been used at least once. "Scratch" refers to volumes or tape areas which are scratched. "Wasted condition" refers to volumes or areas which have been destroyed.

"New volume" and "wasted condition" volumes may be formatted with any data, without relation to a particular volume. "Usable" and "scratch" maintain their own structure until their condition is changed to "wasted condition", because hosts recognize that their volumes should be in the virtual tape apparatus.

One virtual tape volume information is formed of 10 fields of "record type", "record version", "tape volume name", "group name", "tape volume condition", "protect condition", "application space", "number of times of mount", "tape generation time" and "final access time". A virtual tape volume information is inserted between the "special tape volume #1 heading" field and "special tape volume #1 end" field. The number of virtual tape volumes to be inserted is identical to the number of virtual tape volumes 51 registered in the virtual tape apparatus 3.

The data format of the special tape volume #2 is basically identical to that of the special tape volume #1. However, data to be written is different depending on addition, update and deletion of volume. An example of the data format of special tape volume #2 is shown in FIG. 14. Like the tape of the related art, the special tape volume #2 includes a "special tape volume #2 heading" field as the header for recording the tape volume name, etc., a "record type" field indicating this data, a "record version" field indicating a version of this data information (database), a "tape volume name" field indicating the tape volume name (new volume name in the case of additional job) as the work object such as update and deletion, etc., a "group name" field indicating the name of the group to which the tape volume indicated in the "tape volume name" field belongs, a "tape volume condition" field indicating the condition of the tape volume, a "protect condition" field setting the write inhibit information of the tape volume and a "special tape volume #2 end" field indicating the end of the tape volume. The "record version" field, "application space" field, "number of times of mount" field, "tape generation time" field and "final access time" field are all invalidated. To the "tape volume condition" field, "0x80" is set, for example, when the new volume is added. A value of the "tape volume condition" field is unnecessary at the time of update and the value "0x00", for example, is set. As the "tape volume condition" field, the value "0x02", for example, indicating the canceling condition, is set at the time of deletion.

One object tape volume information is formed of 10 fields of "record type", "record version", "tape volume name", "group name", "tape volume condition", "protect condition", "application space", "number of times of mount", "tape generation time" and "final access time". The object tape volume information is inserted between the "special tape volume #2 heading" field and the "special tape volume #2 end" field. The number of such data is identical to the number of virtual tape volumes 51 as the work object.

Figure 15:
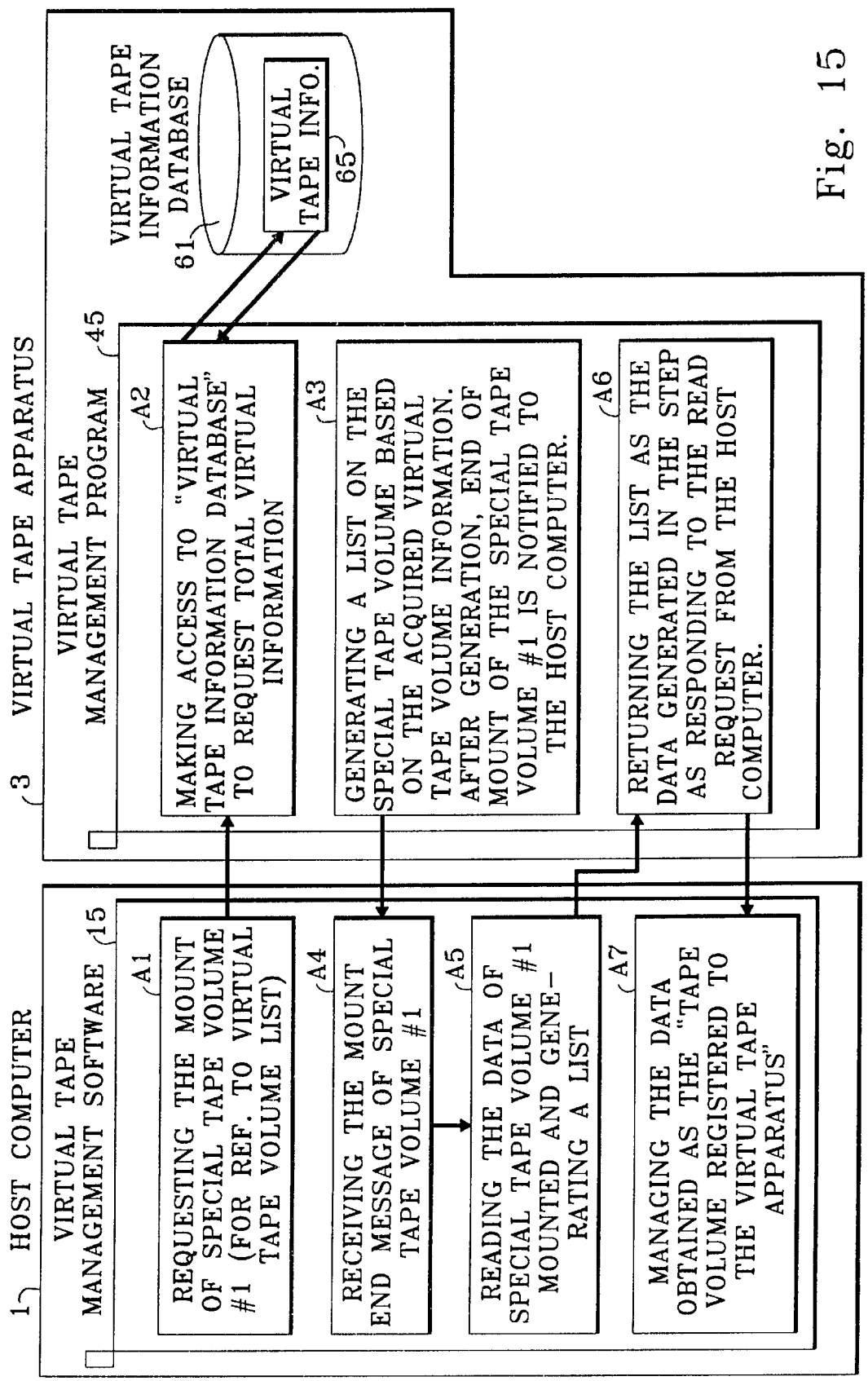
FIG. 15 is a diagram for explaining the process in which the host computer acquires a tape volume list registered in the virtual tape apparatus.

FIG. 15 is a diagram for explaining the operation conducted by the host computer 1 to acquire the tape volume list registered in the virtual tape apparatus 3. In the host computer 1, a virtual tape management software 15, which is the software for management of the virtual tape registered in the virtual tape apparatus 3, is executed. Meanwhile, in the virtual tape apparatus 3, the virtual tape management program 45 is executed.

When the tape volume list acquiring process is started, the virtual tape management software 15 of the host computer 1 outputs a request to mount the special tape volume #1 for referring to the virtual tape volume list (step A1). The virtual tape management program 45 of the virtual tape apparatus 3 accepts the mount request and requests all virtual tape volume information data by making access to the virtual tape information database 61 (step A2). Subsequently, the virtual tape management program 45 generates a list of the special tape volume on the basis of the virtual tape volume information 65 acquired from the virtual tape information database 61. Upon generation of the list, the virtual tape management program 45 sends a message to the host computer 1 in order to notify the end of mounting of the special tape volume #1 (step A3).

The virtual tape management software 15 receives the special tape volume #1 mount end message (step A4) and generates a list by reading the data (refer to FIG. 13) of the mounted special tape volume #1 (step A5). Next, the virtual tape management program 45 accepts a read request output from the host computer 1 and returns the list generated in the step A3 as the data to the host computer (step A6). Here, the virtual tape management software 15 manages the data returned from the virtual tape management program 45 responding to the read request output previously as the "tape volume list registered in the virtual tape apparatus 3" (step A7).

Next, addition, update and deletion of the virtual tape volume under the condition that the virtual tape management software 15 and virtual tape management program 45 are executed respectively in the host computer 1 and virtual tape apparatus 3 will be explained.

Figure 16:
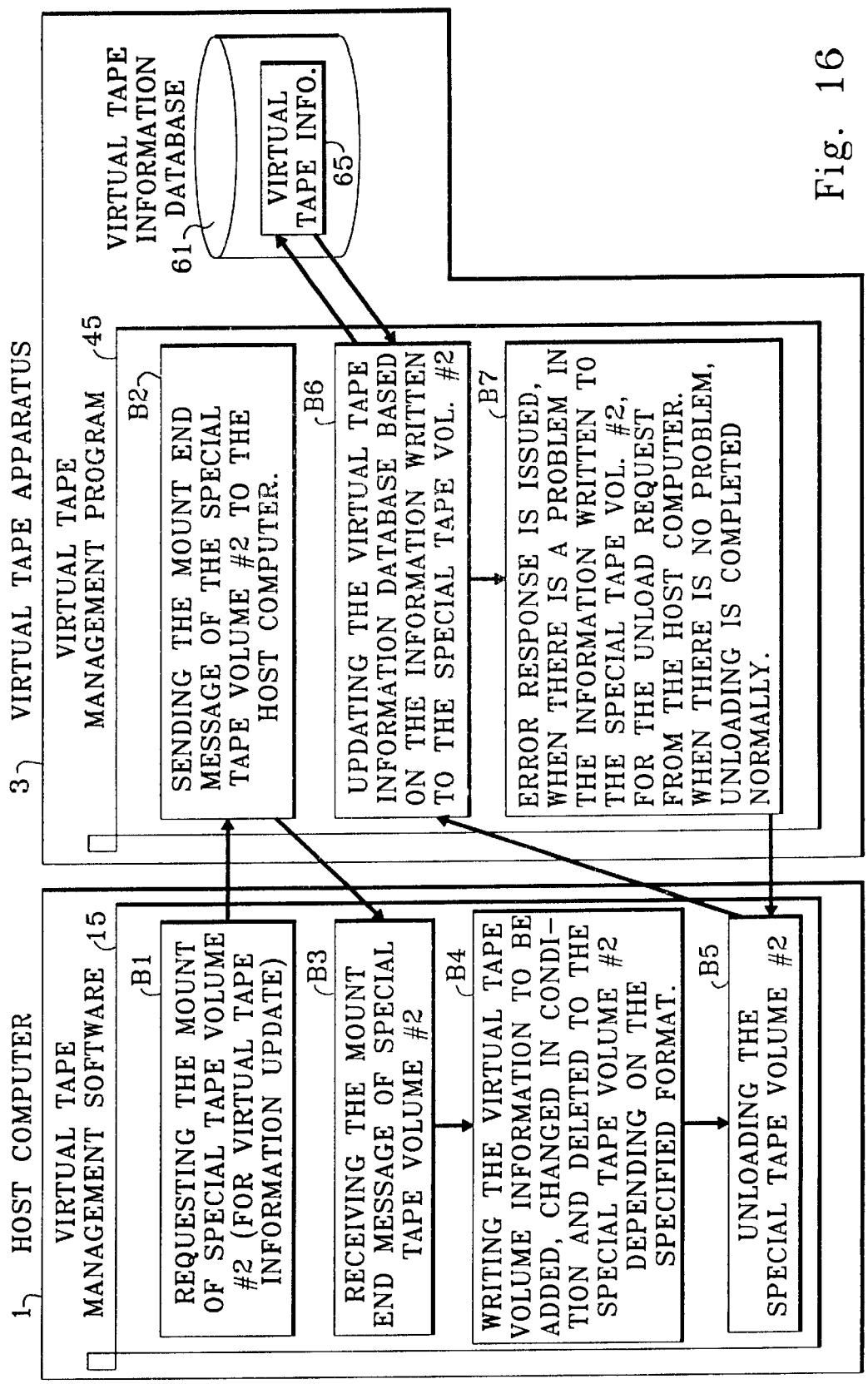
FIG. 16 is a diagram for explaining the process to add, update and delete the virtual tape volume.

FIG. 16 is a diagram for explaining addition, update and deletion of virtual tape volumes.

When the process for addition, update and deletion of a virtual tape volume is started, the virtual tape management software 15 of the host computer 1 issues a request to mount the special tape volume #2 for updating the virtual tape volume information (step B1). The virtual tape management program 45 of the virtual tape apparatus 3 accepts the mount request and sends a message to the host computer 1 to notify the end of mount of the special tape volume #2 (step B2). Here, the virtual tape management software 15 receives the special tape volume #2 mount end message (step B3). Next, the virtual tape management software 15 writes the information of the virtual tape volume to be added, updated or deleted to the special tape volume #2 conforming to the specified format (step B4).

Subsequently, the virtual tape management software 15 demounts (unloads) the special tape volume #2 (step B5). Next, the virtual tape management program 45 updates the virtual tape information database 61 on the basis of the information written to the special tape volume #2 (step B6). In this case, when there is a problem in the information written to the special tape volume #2, the virtual tape management program 45 sends the error response to the unload request from the host computer 1. Meanwhile, the virtual tape management program 45 completes the unloading normally when there is no problem in the information (step B7).

According to the embodiments explained above, the group of the virtual tape volume 51 having the same attribute is developed previously in the virtual storage area 50. Therefore, when the host computer 1 issues a request to the virtual tape volume 51 in the same group, the response rate to this request can be improved. Accordingly, access efficiency of the host computer 1 can also be improved.

Moreover, when the write request is issued to the virtual tape volume 51 in the group, the probability of issuance of a subsequent write request to the other virtual tape volumes 51 of the same group becomes high. When the write request is actually generated to the other virtual tape volumes 51 in the same group, if the tape volume as the write object is developed in the virtual storage area 50 from the real tape volume 21, it is returned again to the real tape volume 21 after the write process. Therefore, development of such tape volumes in the virtual storage area 50 is an ineffective use of the virtual storage area 50. Meanwhile, the virtual tape apparatus of the embodiment explained above can effectively use the virtual storage area 50 for such a virtual tape volume 51. Accordingly, the virtual tape apparatus of the embodiment explained above can acquire the vacant area of the virtual storage area 50 by preventing ineffective use of the virtual storage area 50.

Moreover, the number of real tape volumes 21 can be reduced and the apparatus itself can be reduced in size by writing a plurality of virtual tape volumes 51 at a time to only one real tape volume 21. Thereby, the virtual tape apparatus in relation to the embodiment explained above can further alleviate storage medium cost. Moreover, simultaneous access can be made to a plurality of tape volumes by writing only one virtual tape volume 51 to only one real tape volume 21. Accordingly, the access efficiency of the host computer 1 can be improved depending on the embodiments explained above.

Moreover, according to the embodiments explained above, the virtual tape volume 51 in which the predetermined time has passed from the final writing of data, the virtual tape volume 51 which is not yet written in the real tape volume 21 and the virtual tape volume 51 in which the request frequency from the host computer 1 is relatively low are automatically written into the real tape volume 21. Thereby, the virtual tape apparatus can acquire the vacant area of the virtual storage area 50 without sharing a load to the host computer 1.

Moreover, according to the embodiments explained above, the virtual tape volume 51 which is not yet written to the real tape volume 21, namely the virtual tape volume 51 which is not backed up, is automatically written to the real tape volume 21. Thereby, the virtual tape apparatus in relation to the embodiments explained above can recover the data from the real tape volume 21 even if such data is lost from the virtual storage area 50 due to a crash of the virtual storage area 50. This is because such data is backed up in the real tape volume 21. Therefore, the virtual tape apparatus of the embodiments explained above assures higher reliability of data.

Moreover, according to the embodiments explained above, the host computer 1 edits the special tape volume 55. The host computer 1 reflects the changed contents of the special tape volume 55 by editing the information about the attribute of each virtual tape volume 51 stored in the virtual tape information database 61. Thereby, the virtual tape apparatus in relation to the embodiments explained above enables automatic editing of the attribute of each virtual tape volume 51 by the host computer 1.

As explained above, the present invention is not limited to the explanation and figures of the embodiments and allows various changes and modifications of design. For example, as the high speed storage medium for acquiring the virtual storage area 50, the storage medium other than the hard disk may also be used, so long as it allows higher access than the tape storage medium and enables random access in the time which is not substantially influenced by the location of data.

As explained above, according to the present invention, the grouped virtual tape volumes are developed in the virtual storage area. Therefore, when the host computer has issued a request to the virtual tape volume in the group, the response rate to this request can be improved. Thereby, the access efficiency of the host computer can be improved.

Moreover, when the write request is subsequently issued to the other virtual tape volume in the group under the condition that the possibility for subsequent issuance of a write request to the other virtual tape volume in the group to which the virtual tape volume to which the write request is issued belongs is high, the virtual storage area in which the tape volume as the write object is developed is wasted. This is because the tape volume as the write object is returned again to the actual tape volume by the write operation even when it is developed in the virtual storage area from the actual tape volume.

However, according to the present invention, the virtual tape apparatus can prevent ineffective use of such virtual storage area by not developing the tape volume in the virtual storage for such group. Therefore, the virtual tape apparatus can acquire the vacant area of the virtual storage area.

Moreover, according to the present invention, the virtual tape apparatus writes a plurality of virtual tape volumes at a time to only one actual tape volume. Thereby, the present invention can reduce the storage medium cost.

In addition, the host computer can make access simultaneously to a plurality of tape volumes by writing only one virtual tape volume to one actual tape volume. Thereby, the access efficiency of the host computer can be improved.

Moreover, according to the present invention, the virtual tape apparatus writes automatically, to the actual tape volume, the virtual tape volume in which the predetermined time has passed from the final data writing, when the virtual tape volume which is not yet actually written to the tape volume and the tape volume in which the request frequency from the host computer is relatively low.

Thereby, the virtual tape apparatus can acquire the vacant area in the virtual storage area without sharing a load to the host computer.

Moreover, according to the present invention, the virtual tape apparatus automatically writes, to the actual tape volume, the virtual tape volumes which are not yet actually written to the tape volume. Thereby, even if data is lost from the virtual storage area due to a physical failure of the virtual storage area, reliability of data can be enhanced. This is because such data can be recovered from the actual tape volume since the data is backed up by the actual tape volume.

Moreover, according to the present invention, the host computer edits the virtual special tape volume. The host computer reflects the contents of the special tape volume changed by editing the information regarding the attribute of the virtual tape volume stored in the database. Thereby, the host computer can automatically edit the attribute of the virtual tape volume.

While the principles of the invention have been described above in connection with specific apparatus and applications, it is to be understood that this description is made only by way of example and not as a limitation on the scope of the invention.

What is claimed is:

1. A storage apparatus provided between a tape storage apparatus and a host computer, the tape storage apparatus having a plurality of real tape volumes in at least one tape storage media and a driving mechanism, and the host computer storing data exchanged between the host computer and the tape storage apparatus in the storage apparatus, as a virtual tape volume, the storage apparatus comprising:

a virtual storage area for storing at least one virtual tape volume group having at least one virtual tape volume, information of said virtual tape volume group being formed in a virtual tape information database, said database storing information regarding at least one attribute of each of said virtual tape volumes based on use of each of said virtual tape volumes; and data transfer control means for controlling data transfer among said virtual storage area, the host computer and the tape storage apparatus, wherein said data transfer control means forms groups of said virtual tape volumes having at least one common said attribute, and identifies the said virtual tape volumes included in a selected said virtual tape volume group when the host computer issues a command to any one of the volumes of the virtual storage area.

2. The storage apparatus according to claim 1, wherein when the host computer issues a write request to any one of the virtual tape volumes in the virtual tape volume group, said data transfer control means conducts development from the real tape volume as a write object in the virtual storage area for said requested virtual tape volume included in the virtual tape volume group.

3. The storage apparatus according to claim 1, wherein said data transfer control means writes, on the occasion of writing said virtual tape volume group to a real tape volume in the tape storage media, a plurality of virtual tape volumes to one real tape volume, or only one virtual tape volume to one real tape volume, on the basis of a selected attribute of the virtual tape volume.

4. The storage apparatus according to claim 1, wherein said data transfer control means writes automatically, to a real tape volume in the tape storage media, virtual tape volumes in which a predetermined time has passed from the final data writing among a plurality of virtual tape volumes developed in the virtual storage area.

5. The storage apparatus according to claim 1, wherein said data transfer control means writes automatically, to a real tape volume in the tape storage media, virtual tape volumes which are not yet written to the real tape volume among a plurality of virtual tape volumes developed in the virtual storage area on the basis of a selected attribute of the virtual tape volume.

6. The storage apparatus according to claim 1, wherein said data transfer control means writes automatically, to a real tape volume in the tape storage media, virtual tape volumes having relatively lower request frequency from the host computer among a plurality of virtual tape volumes developed in the virtual storage area, based on a selected attribute of the virtual tape volume.

7. The storage apparatus according to any one of claim 4, 5 or 6, wherein said data transfer control means interrupts the write process when the host computer issues a request to a selected real or virtual tape volume during the automatic writing of virtual tape volumes to real tape volumes.

8. The storage apparatus according to claim 1, wherein when any one tape volume among at least two tape volumes which are used at nearly the same time is developed, said data transfer control means also develops the other tape volumes.

9. The storage apparatus according to claim 1, wherein when any one virtual tape volume among two virtual tape volumes which are used at nearly the same time is written, said data transfer control means also writes the other tape volumes to the real tape volume.

10. A storage apparatus which is provided between a tape storage apparatus and a host computer, the tape storage apparatus having a plurality of real tape volumes in at least one tape storage media and a driving mechanism, the host computer storing data exchanged between the host computer and tape storage apparatus in the storage apparatus as virtual tape volume, the storage apparatus comprising:

a virtual storage area for storing at least one virtual tape volume group having at least one virtual tape volume, information of said virtual tape volume group being formed in a virtual tape information database, said database storing information about at least one attribute of each of said virtual tape volumes based on use of each of said virtual tape volumes;

data transfer control means for controlling transfer of data among said virtual storage area, the host computer and the tape storage apparatus;

a virtual special tape volume for collecting and recording the information about said at least one attribute of all virtual tape volumes; and means for reflecting changed contents of the virtual special tape volume edited by the host computer with respect to the information about attributes of said virtual tape volume stored in said database when the virtual special tape volume is mounted to the tape storage apparatus, wherein said data transfer control means forms groups of said virtual tape volumes having at least one common said attribute, and identifies said virtual tape volumes included in a selected said virtual tape volume group when the host computer issues a command to any one of the volumes of the virtual storage area.

* * * * *